Oct. 2, 1951 — C. F. DE VOE — 2,569,459
METHOD AND APPARATUS FOR STIRRING GLASS
Filed Aug. 9, 1945 — 4 Sheets-Sheet 1

Inventor
CHARLES F. DE VOE
By Knight & Fowler
Attorneys

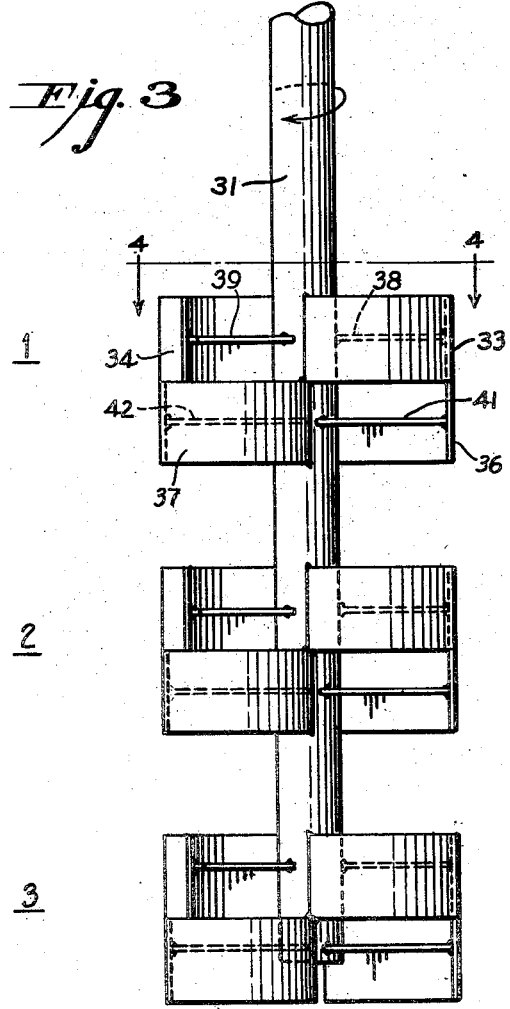
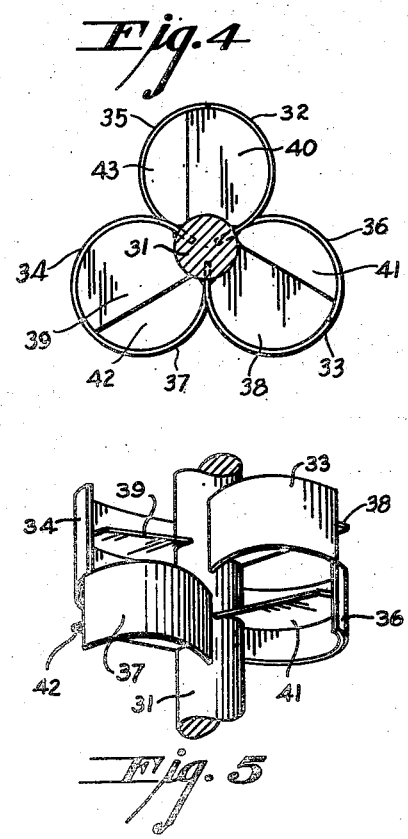

Oct. 2, 1951     C. F. DE VOE     2,569,459
METHOD AND APPARATUS FOR STIRRING GLASS
Filed Aug. 9, 1945     4 Sheets-Sheet 3
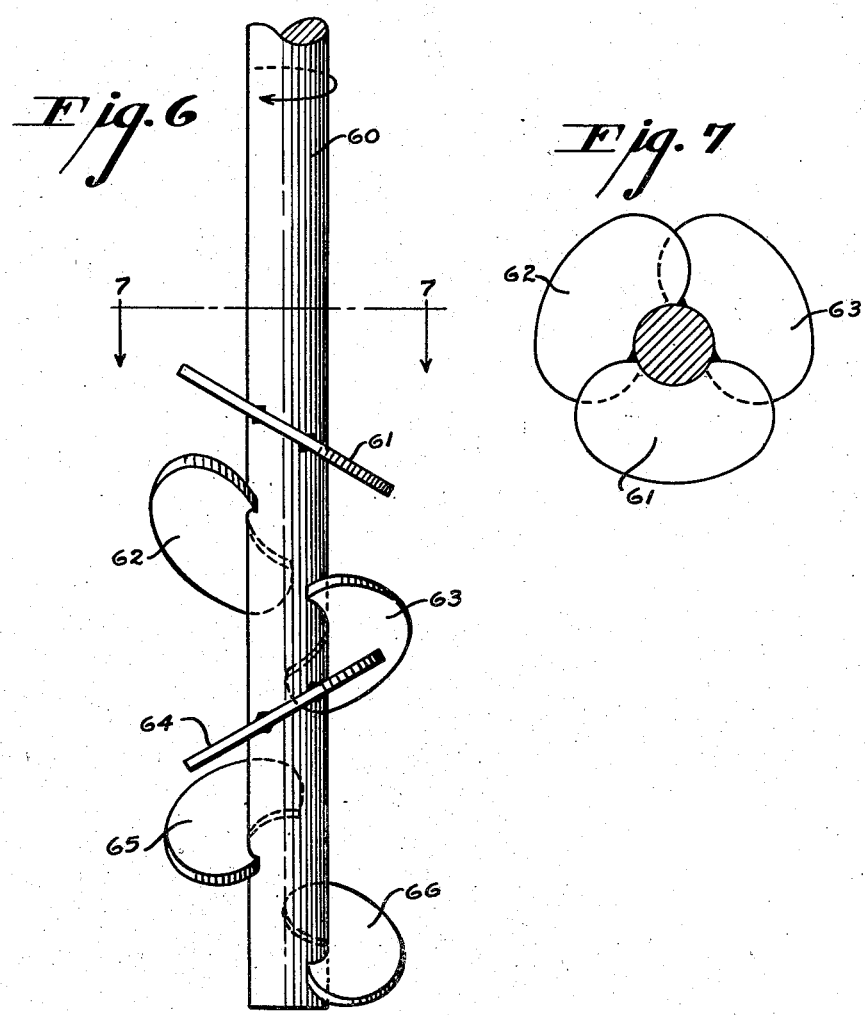
Inventor
CHARLES F. DeVOE
By Knight & Fowler
Attorneys Oct. 2, 1951 — C. F. DE VOE — 2,569,459
METHOD AND APPARATUS FOR STIRRING GLASS
Filed Aug. 9, 1945 — 4 Sheets-Sheet 4
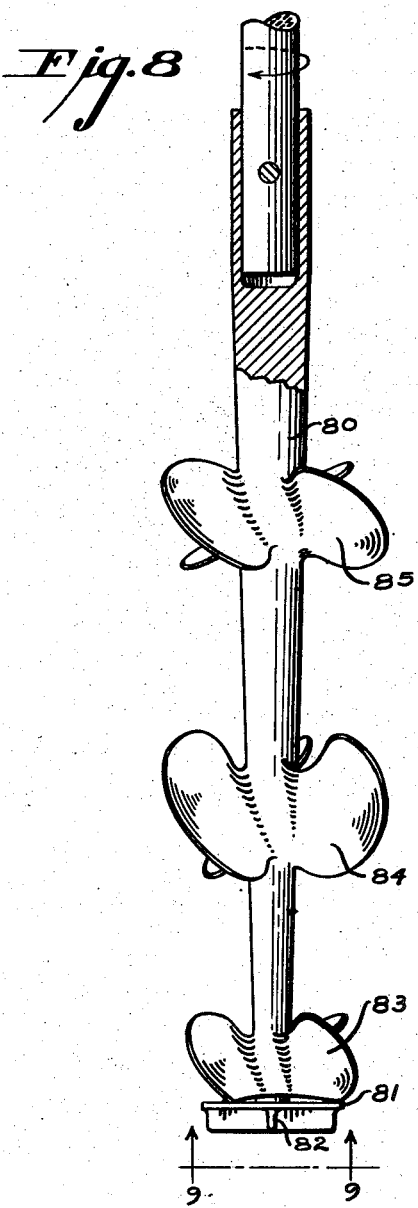
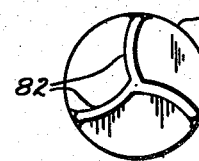
Inventor
CHARLES F. DEVOE
By Knight & Fowler
Attorneys Patented Oct. 2, 1951

2,569,459

UNITED STATES PATENT OFFICE 2,569,459

METHOD AND APPARATUS FOR STIRRING GLASS

Charles F. De Voe, Corning, N. Y., assignor to Corning Glass Works, Corning, N. Y., a corporation of New York Application August 9, 1945, Serial No. 609,878

9 Claims. (Cl. 49—77)

1

The present invention relates to glass stirring, and particularly to means and methods of stirring glass while in transit from a main supply body to a working body or to a forming apparatus.

In the past, attempts have been made to homogenize glass by stirring it with devices associated with the feeder orifices of boots or forehearths connected with the fining ends of melting tanks. It has also been common practice to stir the body of glass in the fining end of a melting tank as well as bodies of glass in pots employed in the production of melts of optical glass with water cooled rods, wooden poles and the like. These attempts have had, at best, only limited success.

The prime object of the present invention is a stirring means and method which will completely eliminate inhomogeneities in molten glass, and particularly one in which a stream of glass from a supply body may be progressively homogenized just in advance of its delivery to a pool for working or just before its delivery to forming apparatus.

Another object is a stirring means and method which is especially suitable for flow feed installations wherein the glass to be worked issues in a continuous stream.

A further object is a stirring means and method suitable for insertion in a stream between a supply body and any conventional form of glass feeding equipment.

In brief, the present invention involves passing all portions of the glass which is to be stirred or homogenized through a restricted zone in which each increment of volume of the glass is subjected to a vigorous shearing action such that cords or inhomogeneous portions of the glass are greatly attenuated and intimately mixed with the remaining portions of the glass. In the illustrated embodiments of the invention fluid glass to be homogenized is fed into the top end of a vertically disposed cylinder and is homogenized as it travels downwardly through the cylinder by a suitable stirring device therein arranged coaxial therewith. The invention further involves stirring methods which are sufficiently severe to dynamically halt the forward movement of the glass along the cylinder wall and to thereby force such glass inwardly where it is subjected to further stirring. Alternatively, the method may include stirring in a manner which involves a nominal upward flow of glass along the cylinder wall.

The cylinder may be arranged to receive molten glass from a remotely disposed supply body by means of a tube or trough. Alternatively, the

2 cylinder may be arranged below and joined to the usual forehearth bottom outlet. If a flow feed is to be used the orifice diameter at the lower end of the cylinder may then be of a size and shape suitable for flow feeding as required by the forming apparatus. If, on the other hand, a needle feed is to be used, glass can be conveyed by an elbow extended from the bottom of the cylinder to a conventional form of feeder structure from which the glass issues from a bottom outlet under a control needle.

By way of example, in Fig. 1 of the accompanying drawings, applicant has shown an elevational view, partly in section, of a form of apparatus embodying the invention adapted to receive glass issuing from a suitable supply body, to stir the glass to a high state of homogeneity, and deliver it in the form of a continuously flowing stream.

Fig. 2, on the other hand, is a side elevational view partly in section of apparatus similar to that of Fig. 1 but arranged to deliver glass into a supply body from which the glass is fed under control of a needle which may be raised and lowered to gob feed in accordance with conventional feeder practice.

Fig. 3 is an enlarged side elevational view of the particular form of stirrer shown in Fig. 1.

Fig. 4 is a view taken on line 4—4 of Fig. 3.

Fig. 5 is a perspective view of a fragment of Fig. 3.

Fig. 6 is a side elevational view of a second form of stirrer.

Fig. 7 is a view taken on line 7—7 of Fig. 6.

Fig. 8 is a side elevational view partly in section of a third form of stirrer.

Fig. 9 is a bottom plan view of the lower end of the stirrer of Fig. 8.

Figure 1:
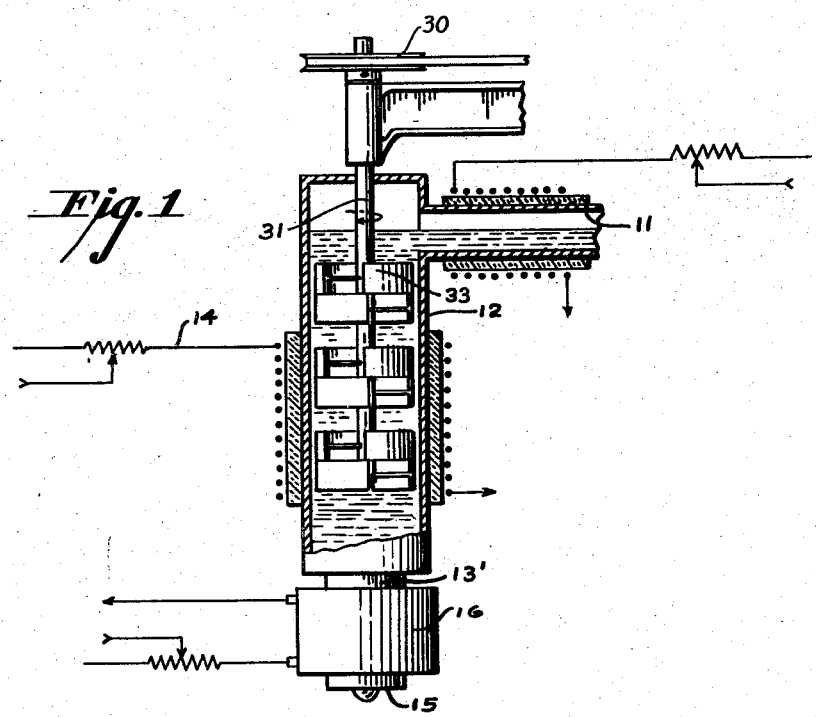

Referring to Fig. 1, the numeral 11 is applied to a glass feed tube extending between a supply body of molten glass (not shown) and a cylinder 12 of a stirring apparatus embodying the invention. The tube 11 and cylinder 12 are preferably made of refractory metal and may be surrounded by electrical heating windings 13 and 14, as shown, and thoroughly insulated against excessive heat loss. The homogenized glass issues from cylinder 12 via the bottom of a feed tube 15 provided with an electric heating winding 16.

The diameter of the outlet of tube 15 may be that deemed most suitable for flow feeding at a rate jointly depending upon the viscosity of the glass, and the particular type of stirrer arranged within cylinder 12, as well as upon the speed of rotation of such stirrer and its diameter relative to that of the cylinder bore. As will be appreciated, the vigor of the stirring action must be increased with increases in feeding rate to maintain a given quality, and as necessary to at least prevent the uninterrupted movement of the glass along the cylinder wall.

The stirring device within cylinder 12 may take any one of a number of forms. It has been found that the most efficient stirrer may not be the best form of stirrer for all operating conditions and, accordingly, a number of stirrers usable interchangeably with cylinder 12 have been disclosed.

Applicant has determined that complete homogenization can be obtained in a mass of molten glass only if the entire body of glass is forced to pass through a zone of turbulence where the different portions of the glass are progressively sheared with respect to one another and cords and inhomogeneities are attenuated and dispersed through the parent glass. Desired results can best be obtained by passing the glass through a stirring chamber, preferably cylindrical in shape, having a longitudinally extending stirrer therein whose maximum diameter is only slightly less than that of the inside of the cylinder. Even under these circumstances certain precautions must be taken to prevent cords of inhomogeneous glass from creeping along the inner wall of the cylinder or along the shaft of the stirrer without becoming mixed with the main body of the glass. These cords are termed "wall cords" and "shaft cords," respectively.

Different devices are employed to eliminate shaft cords and wall cords. Shaft cords are best eliminated by designing the stirrer so that it embodies a mechanical obstacle to such cords which will force glass tending to flow along the shaft out into a zone of turbulence where it is subject to the shearing and mixing action of the vanes. This may be done by overlapping vanes which pump in opposite directions, as in the stirrers of Figs. 3-5 and 6-7 respectively, or by the use of a disk of substantial diameter as in Figs. 8-9.

Wall cords are reduced by the closeness of the coupling between the outer edge of the stirrer and the inner wall of the stirring chamber. They may be completely eliminated by establishing a dynamic dam of glass which is forced outwardly by the stirrer vanes against the chamber wall at a rate sufficiently great that the glass divides and at least some of it forms a counterflow along the chamber wall in opposition to the normal direction of flow of glass through the unit.

The effectiveness of the stirring devices of the present invention is also influenced by the speed of rotation. Thus the capacity of the equipment is determined not only by its dimensions but also by the speed of rotation of the stirrer installed therein. If the rate of flow of the glass through the unit is kept low, as when the bottom of the sleeve has a very constricted delivery outlet or the glass viscosity is high, a speed of rotation of a relatively few revolutions per minute will suffice to appropriately mix the glass and dynamically disrupt the continuity of downward flow of the glass along the cylinder wall. On the other hand, as the orifice outlet is enlarged and the feeding rate thus increased, the speed of stirring must also be increased to maintain the dynamic condition for production of the desired glass quality. Actually the speed of rotation which may be employed is limited only by the ability of the weakest part of the stirrer to withstand the torque at the higher speeds.

The form of stirrer illustrated in Figs. 1, 3, 4 and 5 comprises a shaft 31 driven by a pulley 30 and having groups 1, 2 and 3, respectively, of arcuate shaped impellers arranged along its length. Each group comprises a set of three impellers, such as impellers 32-34, arranged adjacent a similar set 35-37 curved in the opposite direction. Each of the impellers 32-37 has its major surface area in planes parallel to the axis of shaft 31. Each impeller 32-37 also has one end suitably anchored to shaft 31 and each impeller of a set has a corner of its free end anchored to the adjacent corner of an oppositely curved impeller of the adjacent set. Also, to add further rigidity to each set of the impellers and to further promote their stirring action, rigidly secured web members in the form of disk segments 38-43 are provided. Segments 38-43 are arranged normal to the axis of shaft 31, follow the inner curvature of the impellers and overlap one another, thus obstructing direct downward flow of glass within the area occupied by the stirrer. As will be appreciated, on rotation of the stirrer the impellers of some sets throw the glass outward while the impellers of the remaining sets pull the glass inward, thereby thoroughly and rapidly mixing the glass. In short, the movement imparted to the glass by the stirrer is such that not only is the glass thoroughly intermixed but, in addition, the flow of glass directly from tube 11 down the cylinder side wall is effectively prevented by a dynamic dam to such flow created by pressures built up along the wall area.

Experiments have demonstrated that for the highest efficiency when employing a cylinder having a bore diameter of four inches, the best stirrer diameter is in the neighborhood of 3¼" with an impeller curvature radius in the range of ⅝" to 1" and an impeller width somewhere between 1" and 2". In any instance the impeller blade length should be such as to give a wall coupling of ⅜" or less, as it has been found that the closer the rotating impellers are to the side wall the more through-put of glass is possible without sacrificing quality. In this example the ratio of the radius of the impeller to that of the cylinder bore is .81:1 and of course this ratio may in certain installations have to be decreased somewhat, but at the expense of efficiency. For example, as the space between the impellers and cylinder wall is increased to values much below the ratio of .6:1, the stirring effect and possible thru-put of glass may be reduced to a value at which it becomes questionable if the improvements attained warrant the installation. The practical limits of closeness of the impellers to the side wall are dependent entirely on the manufacturing skill exercised, but would rarely exceed the ratio of .98:1. The spacing between groups of sets of the impeller blades from 1" to 4" seems to have little change in effect on the stirring motion or rate of through-put of good glass and accordingly for the sake of compactness 1" spacing between groups is believed preferable.

While this type of stirrer is most efficient if each group of impellers on the stirrer shaft is made up of two or more sets of impellers each having two or more oppositely curved blades, one or more sets with the impellers all curved in the same direction will stir glass satisfactorily when a relatively limited output of glass meets production requirements.

The stirrer illustrated in Figs. 6 and 7 comprises a shaft 60 having a series of blades 61-66 mounted on the shaft at 30° pitch. The blades 61–66 are spaced 1½" in centers on a spiral of two turns in 8" along the shaft. Blades 61, 63 and 65 pump down and 62, 64 and 66 pump up with clockwise rotation. The blades are preferably of such size as to give approximately a ⅝" wall coupling. The movement of glass from the blades outwardly against the cylinder wall tends to prevent the direct downward movement of the glass containing the wall cords therealong, while the opposed direction of pumping of adjacent sets of blades sets up zones of turbulence therebetween which effectively homogenize the glass passing therethrough. Although all of the blades are of equal size and mounted at the same pitch with half of them pumping up and outward and the remainder pumping down and outward, a limited pumping action through the surrounding cylinder occurs when the stirrer is rotated in such direction that the top propeller imparts a downward thrust to the glass. This is the proper direction of rotation and results in thoroughly intermixed high optical quality glass being passed through the cylinder.

The stirrer illustrated in Figs. 8 and 9 comprises a shaft 80 having mounted on the bottom end thereof a circular disk-like stirring element 81 having three depending curved vanes 82. Mounted immediately above disk 81 is a set of three propeller blades 83 set at a 45° pitch. Higher up on shaft 80 are other somewhat larger sets of propeller blades 84 and 85. The propellers of set 84 are at a 45° pitch, whereas those of set 85 are at a 30° pitch so as to create additional stirring without excessive downward pumping. Since all propeller blades are mounted to pump down on clockwise rotation, this type of stirrer can be utilized to accelerate and supplement the gravitational flow of glass. Rotation of the shaft 80 in a clockwise direction is essential to the production of cord-free glass. The volume of glass pumped downwardly must be greater than the volume removed through the bottom orifice so that a countercurrent or dynamic dam is set up against the chamber wall which effectively prevents wall cords from passing into the orifice. In operation, shaft cords sometimes pass through the blades 83—85 without being forced out into a zone of turbulence. In such cases they come into contact with disk 81 and are forced thereby to move out into the zone of turbulence. Furthermore, the curved vanes 82 on the under surface of disk 81 also serve to give an outward thrust to glass thereunder which might otherwise issue with a shaft cord therein.

Figure 2:
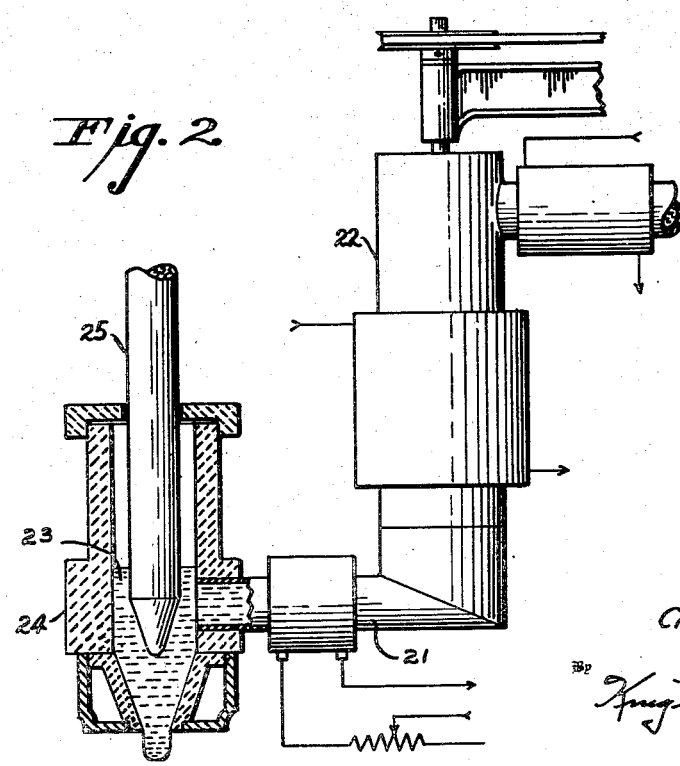

In the structure of Fig. 2 the cylinder 22 may be assumed to contain any one of the disclosed stirrer assemblies, and by means of an elbow 21, conveys the stirred glass into a bowl 24 of a conventional gob feeder from which the glass 23 may be fed under control of a feeder needle 25.

Of the three forms of stirrers disclosed, that shown in Figs. 1, 3, 4 and 5 is the most efficient. It is, however, more difficult to build great strength into a stirrer of this form than in the forms shown in the Figs. 6–9. Also, the building of the form of stirrer shown in Figs. 1, 3 and 5 would be difficult to produce in a non-metallic refractory. In view of these facts, under circumstances requiring stirring rates such that great torque is imparted to the stirrer or in instances in which a non-metallic stirrer is needed, one or the other of the stirrers of Figs. 6–9 is considered preferable.

Although only a limited number of forms of the invention have been illustrated and described, it is understood that many other forms of the invention are well within the basic idea taught and within the scope of the invention as claimed.

What is claimed is:

1. In a glass conditioning apparatus a cylinder, a shaft coaxial therewith, sets of arcuate impeller blades within said cylinder radially projecting from said shaft into close proximity of the wall of the cylinder bore, the curvature of the blades of one set being reversed with respect to the curvature of the blades of another of the sets, the curvature of each of the blades being about an axis parallel to the axis of said shaft, each blade having a web member in the form of a segment of a disk extending in a plane normal to the axis of the shaft and having its curved edge joined to the inner curved surface of the blade.

2. The method which includes continuously flowing molten glass through a substantially vertical cylindrical space, and counteracting the forward movement of glass along the periphery of the space by continuously mechanically forcing glass which is inward of such periphery outwardly toward such periphery while simultaneously imparting a circular motion to the glass.

3. The method which includes continuously flowing molten glass downwardly through a substantially vertical cylindrical space, simultaneously imparting a circular motion to the glass, and counteracting the downward movement of glass along the periphery of the space by continuously mechanically downwardly forcing glass within such space at a rate greater than that at which glass can be withdrawn from the lower end of such space whereby a portion of such downwardly forced glass is impelled upwardly from the lower end of such space along the periphery thereof.

4. The method which includes continuously flowing molten glass through a substantially vertical cylindrical space, counteracting the forward movement of glass along the periphery of the space by continuously mechanically forcing glass which is inward of such periphery outwardly toward such periphery to dynamically prevent free forward movement of glass along such periphery, simultaneously imparting a circular motion to the glass, and continuously mechanically forcing inwardly toward the center of such space glass which is outward from the center of such space so that thorough intermixing of the glass is effected as it passes through the space.

5. The method of improving the quality of glass, which comprises introducing molten glass from a supply body into one end of a substantially cylindrically shaped zone at a rate to maintain the zone filled, imparting a circular motion to the glass during its passage through such zone, simultaneously inwardly displacing glass flowing along the cylindrical boundary of such zone by mechanically forcing a portion of the glass which is inward from such boundary outwardly toward such boundary, and removing glass of improved quality from the other end of the zone.

6. The method of improving the quality of glass, which comprises introducing molten glass from a supply body into one end of a substantially cylindrically shaped zone at a rate to maintain the zone filled, imparting a circular motion to the glass during its passage through such zone, simultaneously inwardly displacing glass flowing along the cylindrical boundary of such zone by mechanically forcing at least a portion of the glass which is inward from such boundary outwardly toward such boundary, the rate at which such glass is forced outwardly being sufficient to dynamically prevent the forward flow of glass along such boundary, and removing glass of improved quality from the other end of the zone.

7. The method of improving the quality of glass, which comprises introducing molten glass from a supply body into one end of a substantially cylindrically shaped zone at a rate to maintain the zone filled, imparting a circular motion to the glass during its passage through such zone, simultaneously inwardly displacing glass flowing along the cylindrical boundary of such zone by mechanically forcing a portion of the glass which is inward from such boundary outwardly toward such boundary, subjecting all the glass which is inward from such boundary to a repeated shearing action, and removing glass of improved quality from the other end of the zone.

8. A stirring device comprising a shaft having sets of arcuate impeller blades radially projecting therefrom, the curvature of the blades of one set being reversed with respect to the curvature of the blades of another of the sets, the curvature of each of the blades being about an axis parallel to the axis of said shaft, each blade having a web member in the form of a segment of a disk extending in a plane normal to the axis of the shaft and having its curved edge joined to the inner curved surface of the blade.

9. The method as claimed in claim 5, which includes the step of simultaneously mechanically forcing inwardly toward the center of such zone a portion of the glass which is outward from the center of such zone.

CHARLES F. DE VOE.

REFERENCES CITED

The following references are of record in the file of this patent:

UNITED STATES PATENTS

| Number | Name | Date |
| --- | --- | --- |
| 655,009 | Raw | July 31, 1900 |
| 914,973 | Pickett | Mar. 9, 1909 |
| 1,084,210 | Howard | Jan. 13, 1914 |
| 1,416,307 | Severson | May 16, 1922 |
| 1,430,040 | Trust et al. | Sept. 26, 1922 |
| 1,603,221 | Thomson | Oct. 12, 1926 |
| 1,608,710 | Morrison | Nov. 30, 1926 |
| 1,816,982 | McNish | Aug. 4, 1931 |
| 1,927,101 | Stenhouse | Sept. 19, 1933 |
| 2,137,547 | Snow | Nov. 22, 1938 |
| 2,431,478 | Hill | Nov. 25, 1947 |

FOREIGN PATENTS

| Number | Country | Date |
| --- | --- | --- |
| 711,976 | France | July 8, 1931 |